United States Patent
Egan et al.

(10) Patent No.: US 10,476,882 B2
(45) Date of Patent: Nov. 12, 2019

(54) DETERMINING USER ACCESS TO GROUPS GENERATED IN A CLOSED ONLINE SYSTEM BASED ON CATEGORIES DETERMINED FOR THE GROUPS

(71) Applicant: Facebook, Inc., Menlo Park, CA (US)

(72) Inventors: John David Egan, London (GB); Tarmo Lehtpuu, London (GB); Blaise Andrew DiPersia, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 151 days.

(21) Appl. No.: 15/273,512

(22) Filed: Sep. 22, 2016

(65) Prior Publication Data

US 2018/0083976 A1 Mar. 22, 2018

(51) Int. Cl.
*H04L 29/06* (2006.01)
*H04L 29/08* (2006.01)

(52) U.S. Cl.
CPC .......... *H04L 63/104* (2013.01); *H04L 67/306* (2013.01)

(58) Field of Classification Search
CPC . G06F 17/30867; H04L 63/102; H04L 67/22; H04L 67/306; H04L 67/26; H04L 67/02; H04L 63/104; H04L 63/105
See application file for complete search history.

(56) References Cited

U.S. PATENT DOCUMENTS

| | | | | |
|---|---|---|---|---|
| 9,768,969 B2* | 9/2017 | Weinstein | ............. | H04L 12/185 |
| 9,847,994 B1* | 12/2017 | Kelly | ............. | H04L 67/06 |
| 2005/0021750 A1* | 1/2005 | Abrams | ............. | G06Q 10/10 |
| | | | | 709/225 |
| 2005/0172001 A1* | 8/2005 | Zaner | ............. | H04L 29/06 |
| | | | | 709/205 |
| 2009/0282100 A1* | 11/2009 | Kim | ............. | G06Q 10/107 |
| | | | | 709/203 |
| 2010/0269158 A1* | 10/2010 | Ehler | ............. | G06F 17/30867 |
| | | | | 726/4 |
| 2011/0119598 A1* | 5/2011 | Traylor | ............. | G06Q 10/10 |
| | | | | 715/753 |
| 2011/0270926 A1* | 11/2011 | Boyd | ............. | G06Q 10/1095 |
| | | | | 709/204 |
| 2012/0005232 A1* | 1/2012 | Oleynik | ............. | G06F 17/30705 |
| | | | | 707/792 |
| 2013/0254300 A1* | 9/2013 | Berk | ............. | H04L 51/28 |
| | | | | 709/206 |
| 2013/0262131 A1* | 10/2013 | Lewis | ............. | G06Q 10/10 |
| | | | | 705/1.1 |

(Continued)

*Primary Examiner* — John B King
(74) *Attorney, Agent, or Firm* — Fenwick & West LLP

(57) ABSTRACT

An online system provides a social networking environment for a set of users, such as members of an organization. The online system allows generation of groups of users within the set to allow users to more easily communicate content with other users. When a user creates a new group, the online system identifies multiple categories to the user, and the user selects a category for association with the group. Categories are associated with access rights regulating user access to content associated with the group or users capable of performing various actions with the group. Additionally, a member of the group may invite entities outside of the online system, or outside of the set of users, to join the group. If the entity joins the group, the online system provides content associated with the group to the entity, allowing the entity to receive content from the group.

18 Claims, 2 Drawing Sheets

(56) References Cited

U.S. PATENT DOCUMENTS

| | | | | |
|---|---|---|---|---|
| 2014/0280544 A1* | 9/2014 | Aldereguia | .............. | H04L 51/20 |
| | | | | 709/204 |
| 2015/0006269 A1* | 1/2015 | O'Day | ................ | G06Q 30/0214 |
| | | | | 705/14.16 |
| 2015/0067055 A1* | 3/2015 | Khera | ..................... | H04L 67/22 |
| | | | | 709/204 |
| 2015/0142689 A1* | 5/2015 | Squires | .............. | G06Q 30/0279 |
| | | | | 705/329 |
| 2015/0163258 A1* | 6/2015 | Garcia, III | .............. | H04L 67/24 |
| | | | | 709/204 |
| 2015/0169888 A1* | 6/2015 | McClendon | ......... | G06F 21/6218 |
| | | | | 707/785 |
| 2015/0178373 A1* | 6/2015 | Smith | .................... | G06F 16/285 |
| | | | | 707/722 |
| 2015/0288701 A1* | 10/2015 | Brand | ................... | H04L 63/102 |
| | | | | 726/7 |
| 2017/0109839 A1* | 4/2017 | Berryman | .............. | G06Q 50/01 |
| 2017/0148055 A1* | 5/2017 | Boothroyd | .............. | G06Q 30/02 |

* cited by examiner

DETERMINING USER ACCESS TO GROUPS GENERATED IN A CLOSED ONLINE SYSTEM BASED ON CATEGORIES DETERMINED FOR THE GROUPS

BACKGROUND

This disclosure relates generally to online systems, and more specifically to regulating access to content by users of the online system.

An online system allows its users to connect to and to communicate with other users of the online system. Users create profiles on an online system that are tied to their identities and include information about the users, such as interests and demographic information. The users may be individuals or entities such as corporations or charities. Users may share information about themselves via an online system by posting content for presentation to other online system users.

Additionally, an online system may maintain groups of users, allowing a user to provide content to a group for presentation to each user included in the group. A group may be associated with a topic, with a location, or with any other suitable characteristic, so a user included in the group may more easily view or share content associated with the characteristic associated with the group. For example, users in a group provide content items to a group to simplify presentation of the content items to other users in the group.

However, if an online system maintains users who are members of an organization, such as a business, different users may have different access to content provided to the online system based on the users' roles in the organization. For example, the organization may limit access to certain information to users who are managers in the organization and prevent access to the certain information by users having other roles in the organization. While maintaining groups of users allows an online system to more easily distribute content to multiple users, conventional online systems do not allow group creation to easily account for different levels of access to content provided to the group by users having different characteristics, such as different roles within an organization.

SUMMARY

An online system provides a social networking environment for a set of users of the online system. Users in the set of users may be members of an organization. For example, users in the set are employees of a company. The online system allows users in the set to establish connections with other users of the online system. In some embodiments, the online system allows users in the set to establish connections with users outside of the set. When a user establishes a connection to another user, the user receives status updates and other information associated with the other user.

To simplify communication of content items among users, the online system maintains various groups, with each group including one or more users of the online system. A user may provide content items to a group, and the online system presents the content to other users included in the group. A user may provide content items to a group including the user for distribution to other users in the group or may view or otherwise access content items associated with the group including the user.

However, different users in the set may be differently authorized to access various content provided to the online system. For example, if users in the set are employees of a company, content accessible to a user in the set is based on a job title or job classification of the user within the employee. In the preceding example, users in the set identified as managers within the company are authorized to access certain content that other users in the set identified as designers are not authorized to access.

To allow users in the set to establish groups for distributing content while enforcing different authorizations for users in the set to access content, the online system associates a category with a group when the group is established. In various embodiments, the online system maintains multiple categories and a user establishing the group selects a category for the group when establishing the group. A category for the group may be selected from a predefined listing of categories maintained by the online system. Different access rights are associated with different categories, where access rights associated with a category identify characteristics of users authorized to access a group associated with the category or identify characteristics of users who are not authorized to access the group associated with the category. For example, if the set of users are employees of a company, a category is associated with access rights preventing users who have one or more specific job titles from accessing a group associated with the category. As another example, if the set of users are employees of a company, a category is associated with access rights authorizes users who were hired by the company after a specific date to access a group associated with the category. Hence, the category associated with a group identifies users in the set who are capable of accessing content provided to the group by various users in the set.

In some embodiments, a category also identifies users in the set authorized to perform one or more actions associated with the group. For example, a category identifies users capable of inviting additional users to a group associated with the category or identifies users capable of providing content to the group associated with the category. A category may identify user identifiers (or other identifying information) of specific users authorized to invite additional users to the group associated with the category or to provide content to the group associated with the category. Alternatively, a category identifies one or more characteristics of users capable of inviting additional users to a group associated with the category or capable of providing content to the group associated with the category. For example, if the set of users are employees in a company, a category identifies an employment location or a hire date associated with users in the set who are authorized to post content to a group associated with the category or who are authorized to invite additional users to the group associated with the category. Hence, selecting a category associated with a group allows a user establishing a group to regulate access to content provided to the group, and may also allow the user establishing the group to regulate users capable of modifying the group.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
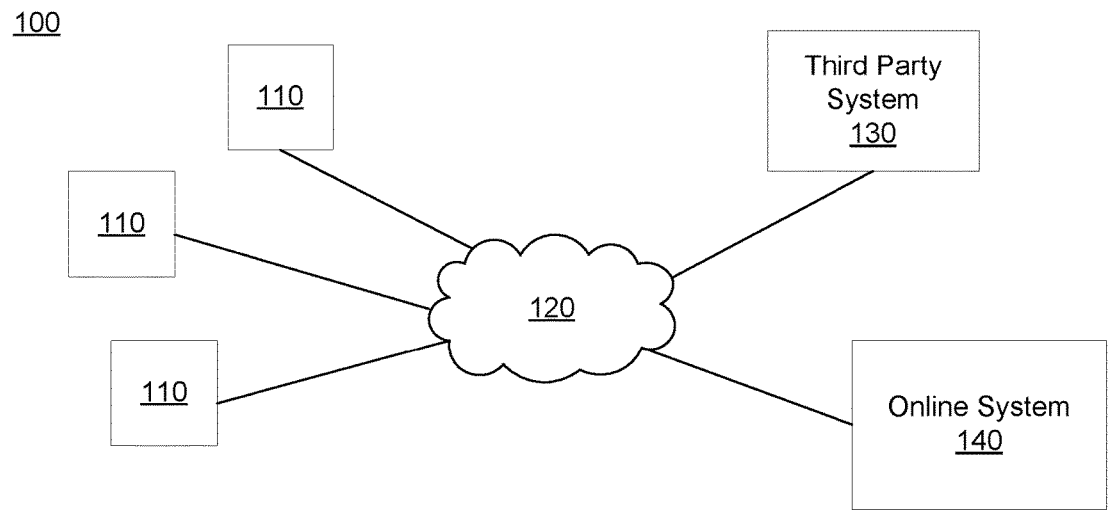
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
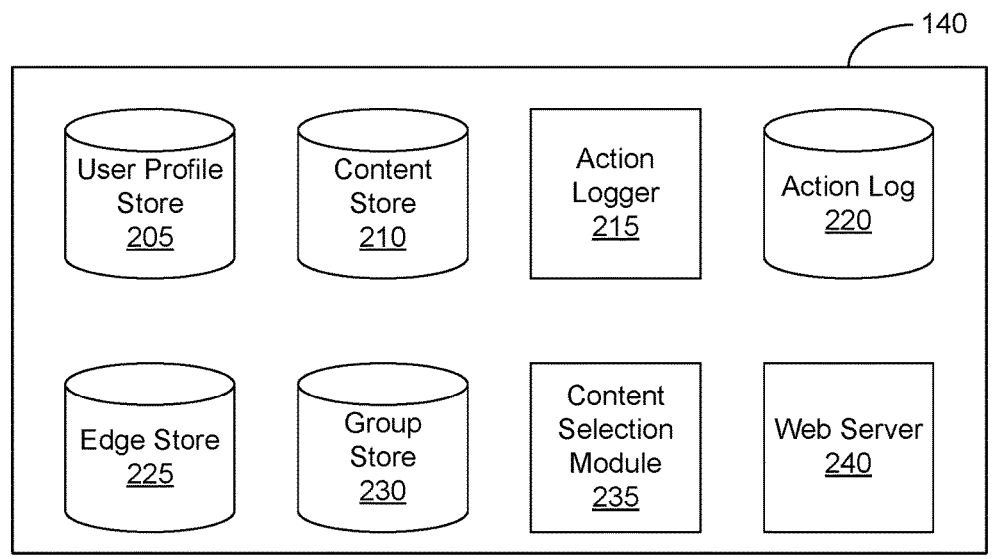
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a group store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items (including advertisements), and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, interactions with advertisements, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, measures of affinity, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 includes information identifying various groups of users. A group is associated with a group identifier stored by the group store 230 that uniquely identifies the group. One or more identifiers associated with users are associated with the group identifier to identify users of online system 140 included in the group. Other information may be associated with a group identifier, such as a name identifying a group corresponding to the group identifier, a description associated with the group, descriptive information associated with the group (e.g., a location), or other suitable information. Additionally, one or more content identifiers specifying content items are associated with a group identifier to identify content items associated with a group associated with the group identifier. If a content item, such as a message, is communicated to a group, the message is communicated to users associated with the group. Hence, maintaining a group allows content to be more easily communicated to users within the group by providing the content to the group rather than communicating the content to various individual users. A group may be generated by a user of the online system 140 identifying users associated with the group or the online system 140 may generate one or more groups based on characteristics associated with users of the online system 140. Additionally, a user's interactions with a group are identified in the action log 220 or in the group store 230 by associating a group identifier with information describing an interaction with the group.

Additionally, the group store 230 associates a category associated with a group identifier. Access rights associated with a category regulate access to content associated with the category. In various embodiments, a category is associated with access rights specifying one or more characteristics of users who are authorized to access content associated with the category. For example, users having characteristics specified by a category associated with a group are authorized to access content provided to the group. Alternatively, a category is associated with access rights specifying one or more characteristics of users who are prevented from accessing content associated with the category. As an example, users having characteristics specified by a group are prevented from accessing content provided to the group. The online system 140 may maintain a list of categories in the group store, and a user establishing a group selects a category from the list to associate with the group when establishing the group. As further described below in conjunction with FIG. 3, when another user requests content provided to the group, the online system 140 determines whether the other user is able to access content provided to the group based on characteristics of the other user and the category associated with the group. Hence, the category associated with the group identifies online system users authorized to access content provided to the group. In some embodiments, a category associated with a group also identifies users capable of inviting additional users to the group, capable of removing additional users from the group, capable of providing content to the group, capable of removing content from the group, or capable of performing any other suitable action associated with the group.

The content selection module 235 selects one or more content items for communication to a client device 110 to be presented to a user. Content items eligible for presentation to the user are retrieved from the content store 210 or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items eligible for presentation to the user may include advertisements from ad requests or other content items associated with bid amounts. The content selection module 235 uses the bid amounts associated with advertisement requests ("ad requests") when selecting content for presentation to the user. In various embodiments, the content selection module 235 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting advertisement content from the ad request or for presenting the content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

Additionally, the content selection module 235 may identify content items for presentation to a user from content items provided to groups including the user based on information in the content store 210 and in the group store 230. As further described below in conjunction with FIG. 3, groups may be associated with a category that regulates access to content associated with the group. For example, when a user requests a content item provided to a group, the content selection module 235 determines whether at least a threshold number of characteristics of the user match characteristics of users authorized to access content provided to the group specified by access rights associated with a category associated with the group. The content selection module 235 presents the content item to the user if at least a threshold number of the user's characteristics match characteristics of users authorized to access content provided to the group and does not present the content item to the user if less than the threshold number of the user's characteristics match characteristics of users authorized to access content provided to the group. Hence, a category associated with a group regulates presentation of content associated with the group to different online system users.

For example, the content selection module 235 receives a request to present a feed of content to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, information describing actions associated with other users connected to the user or other data associated with users connected to the user is retrieved and used to select content items, such as content items describing actions associated with one or more of the other users. Additionally, one or more advertisement requests ("ad requests") may be retrieved from the content store 210. The retrieved content items or ad requests are analyzed by the content selection module 235 to identify candidate content items, including ad requests, eligible for presentation to the user. For example, content items associated with users who not connected to the user or content items associated with users for whom the user has less than a threshold affinity are discarded as candidate content items. Based on various criteria, the content selection module 235 selects one or more of the content items or ad requests identified as candidate content for presentation to the user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine the order in which selected content items or advertisements are presented via the feed. For example, the content selection module 235 orders content items or advertisements in the feed based on likelihoods of the user interacting with various content items or advertisements.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, or BlackberryOS.

Regulating Access by Users to Groups of Users Maintained by an Online System

Figure 3:
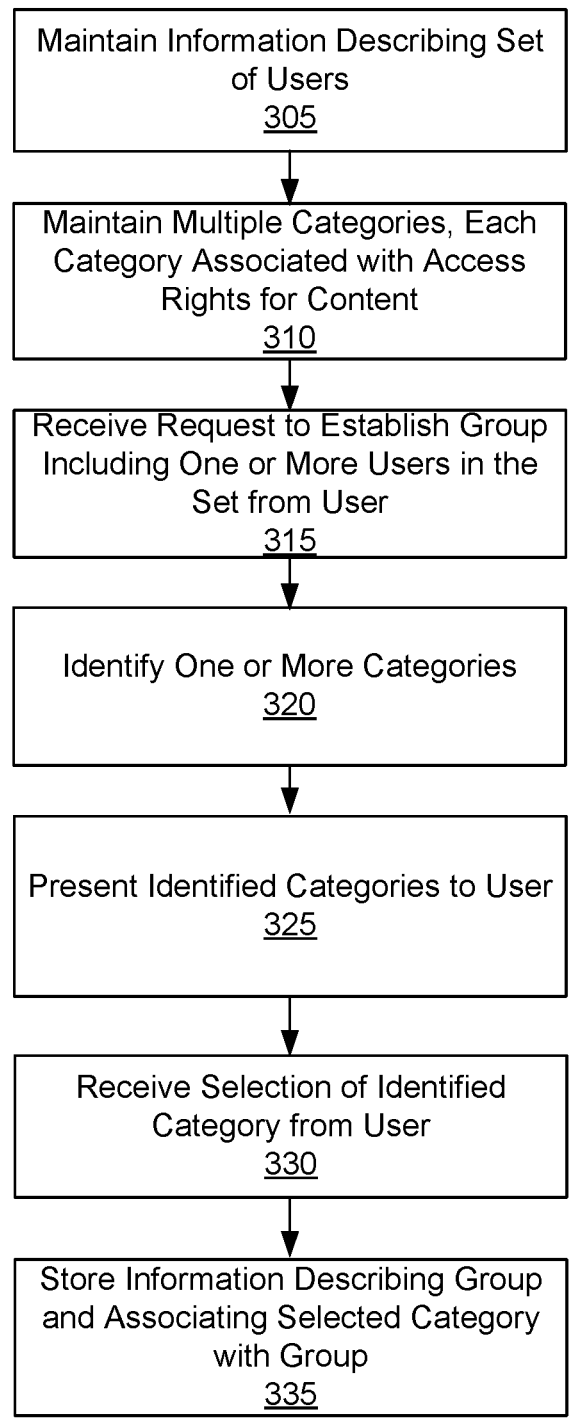
FIG. 3 is a flowchart of a method for regulating access to a group including users from a set of users of an online system, in accordance with an embodiment.

FIG. 3 is a flowchart of one embodiment of a method for method for regulating access to a group including users from a set of users of an online system 140. In other embodiments, the method may include different and/or additional steps than those shown in FIG. 3. Additionally, steps of the method may be performed in different orders than the order described in conjunction with FIG. 3 in various embodiments.

The online system 140 maintains 305 information identifying a set of users of the online system 140, where users in the set are members of an organization (e.g., a bowling league, a company, a charity, etc.). The set of users may change over time as membership in the organization changes, so the maintained information may be modified over time to remove users from the set or to add users to the set. For example, online system users who are employees of a company may change over time as new employees are hired by the company and as existing employees leave the company, so the online system 140 modifies the information identifying the set of users over time, allowing the online system 140 to maintain 305 current information identifying the set of users.

The information maintained 305 by the online system 140 to identify the set of users includes a user identifier (e.g., a username, an e-mail address, or a user identifier associated with the user by the online system 140) associated with each user in the set or other information associated each user in the set allowing the online system 140 to identify a user (e.g., the user's name, a user identification number, a profile picture). Additionally, the online system 140 maintains 305 various characteristics for users in the set. As further described above in conjunction with FIG. 2, characteristics of a user may be information declared or specified by the user (e.g., demographic information, location, education history), inferred by the online system 140 based on actions by the user, or provided by the organization of which the user is a member (e.g., a role within the organization, a job title, a hiring date, an employment location, a security clearance, etc.). Additionally, the online system 140 may associate an identifier of the organization including the user in information identifying the user. For example, the online system 140 stores an identifier of a law firm in each user profile in a set of user profiles maintained 305 for users employed by the law firm.

To simplify communication of content items among users in the set, the online system 140 maintains various groups that each include one or more users in the set. A user may provide content items to a group, and the online system 140 presents the content to other users included in the group. As described above in conjunction with FIG. 2, a group includes one or more users of online system 140 and is associated with a group identifier uniquely identifying the group. One or more identifiers of users included in a group are associated with a group identifier by the online system 140 to identify online system users included in the group corresponding to the group identifier. Other information may be associated with a group identifier, such as a name identifying a group corresponding to the group identifier, a description associated with the group, descriptive information associated with the group (e.g., a location), topics associated with the group, a user who created the group, or other suitable information.

Additionally, the online system 140 maintains 310 multiple categories, each category associated with access rights regulating access to users associated with a category. In various embodiments, a category is associated with access rights specifying one or more characteristics of users who are authorized to access content associated with the category. For example, users having characteristics specified by a category associated with a group are authorized to access content provided to the group. Alternatively, a category is associated with access rights specifying one or more characteristics of users who are prevented from accessing content associated with the category. As an example, users having characteristics specified by a group are prevented from accessing content provided to the group. The online system 140 may maintain a list of categories, allowing users to associate a category from the list with content associated with the user. In some embodiments, the online system 140 maintains 310 a list of predefined categories. Alternatively, the online system 140 determines categories based on information provided to the online system 140 by various users or interaction by online system users with content provided by the online system 140.

In some embodiments, a category also identifies users in the set authorized to perform one or more actions associated with the group. For example, a category identifies users capable of inviting additional users to a group associated with the category or identifies users capable of providing content to the group associated with the category. A category may identify user identifiers (or other identifying information) of specific users authorized to invite additional users to the group associated with the category or to provide content to the group associated with the category. Alternatively, a category identifies one or more characteristics of users capable of inviting additional users to a group associated with the category or capable of providing content to the group associated with the category. For example, if the set of users are employees in a company, a category identifies an employment location or a hire date associated with users in the set who are authorized to post content to a group associated with the category or who are authorized to invite additional users to the group associated with the category.

The online system 140 receives 315 a request to establish a group including one or more users in the set from a user. For example, the online system 140 receives 315 a request from a user identifying one or more additional users to include in the group and information identifying the group, such as a group name. The request may include information identifying specific additional users or identifying one or more characteristics of additional users to include in the group. In some embodiments, the request identifies one or more characteristics of the group, such as a topic or a subject associated with the group.

However, different users in the set may be authorized to access different content provided to the online system 140. For example, if users in the set are employees of a company, content accessible to a user in the set is based on a job title or job classification of the user within the employee. In the preceding example, users in the set identified as managers within the company are authorized to access certain content that other users in the set identified as designers are not authorized to access. In other embodiments, different characteristics of users in the set may affect content provided to the online system 140 accessible to different users in the set.

To allow the user requesting establishment of the group to account for different authorizations to access content provided to the online system 140, the online system 140 identifies 320 one or more of the maintained categories in response to receiving 315 the request to establish the group and presents 325 the identified categories to the user. The online system 140 may identify 320 one or more of the maintained categories using any suitable criteria. In some embodiments, the online system 140 ranks various categories based on frequencies with which categories are associated with groups and identifies 320 categories having at least a threshold position in the ranking. As another example, the online system 140 ranks categories based on a number of times each category was associated with a group and identifies 320 categories having at least a threshold position in the ranking. The online system 140 modifies one or more rankings of categories as users associate categories with groups, allowing the one or more rakings to accurately represent usage of different categories. In some embodiments, the online system 140 identifies 320 categories based on prior actions by the user from whom the request was received 315. For example, the online system 140 ranks categories based on a number of times the user has associated different categories with groups and identifies 320 categories having at least a threshold position in the ranking. If the user has not previously associated a category with at least a threshold number of groups, the online system 140 may identify additional users in the set having at least a threshold number or at least a threshold percentage of characteristics matching characteristics of the user and identify 320 categories based on association of categories with groups by the identified additional users.

The online system 140 receives 330 a selection of one of the identified categories from the user and stores 335 information describing the group of users that associates the selected category with the group. For example, the online system 140 receives 330 a selection of an identified category via a user interface presenting the identified categories the user and stores 335 a group identifier in association with information describing the group and with the selected category. After storing 335 information describing the group, the online system 140 may receive content provided to the group and associates the content with the group subject to access rights associated with the selected category. When the online system 140 receives a request from an additional user to provide content to the group, the online system 140 provides the content to the group if access rights associated with the selected category for the group authorize the additional user to provide content to the group (e.g., if the additional user has at least a threshold number of characteristics matching characteristics specified by the access rights allowing users to provide content to the group). Similarly, when the online system 140 receives a request from an additional user to access content associated with the group, the online system 140 presents the content to the additional user if access rights associated with the selected category for the group authorize the additional user to access content associated with the user (e.g., if the additional user has at least a threshold number of characteristics matching characteristics specified by the access rights allowing users to access content associated with the group).

In embodiments where categories identify users in the set authorized to perform one or more actions associated with the group, when an additional user in the set requests to perform an action associated with the group, the online system 140 determines whether access rights associated with the selected category authorizes the additional user to perform the requested action (e.g., whether the additional user has at least a threshold number of characteristics matching characteristics specified by the access rights authorizing users to perform the requested action). Responsive to determining the access rights associated with the selected category authorize the additional user to perform the requested action, the online system 140 performs the requested action. However, responsive to determining the access rights associated with the selected category do not authorize the additional user to perform the requested action, the online system 140 does not perform the requested action, and may indicate to the additional user that the requested action cannot be performed.

In addition to allowing a user in the set to regulate access to a group by selecting a category to associate with the group, the online system 140 may allow a user included in a group to invite an entity outside of the set of users to join the group. The entity outside the set of users may be a user of the online system 140 who is not included in the set or may be an individual for whom the online system 140 does not maintain information. For example, if the online system 140 maintains a set of users who are members of an organization, the entity may be a user of the online system who is not a member of the organization or may be an entity for which the online system 140 does not maintain information. To invite an entity outside of the set of users to join the group, a user authorized to invite users to the group provides the online system 140 with information identifying the entity, and the online system 140 generates and communicates an invitation to the group comprising executable instructions to a client device 110 associated with the entity. In some embodiments, the executable instructions in the invitation comprise a link including information identifying the online system 140 and identifying the group (e.g., including a destination address of the online system 140 and a group identifier corresponding to the group). When the client device 110 associated with the entity executes the instructions, the client device 110 associated with the entity communicates information to the online system 140 identifying information for the online system 140 to provide content to the entity (e.g., an e-mail address for the entity). For example, when the entity accesses a link including information identifying the online system 140 and the group via a client device 110, the online system 140 receives an e-mail address associated with the entity. After receiving information for providing content to the entity, the online system 140 subsequently communicates content associated with the group to the entity using the provided content. For example, when a user in the set provides content to the group, the online system 140 communicates a notification to the entity via the information for providing content to the entity identifying the content provided to the group (e.g., an e-mail to an e-mail address associated with the entity including or describing the content provided to the group). Hence, the online system 140 allows entities outside of the set of users (e.g., online system users not in the set or entities for which the online system 140 does not maintain information) to receive content associated with the group without being in the set of users or being a user of the online system 140.

The online system 140 may allow a user in a group who is authorized to invite other users to the group to generate a persistent link including instructions that, when executed, provide instructions to the online system 140 identifying an additional user who executed the instructions and a request for the additional user to join the group. After receiving the request, the online system 140 includes the additional user in the group (subject to access rights specified by a category associated with the group, if any). For example, when an additional user accesses the persistent link, instructions specified by the persistent link are executed by a client device 110 to obtain a user identifier associated with the additional user; the user identifier and an group identifier corresponding to the group are provided to the online system 140 in a request for the additional user to become a member of the group. The persistent link may be presented to multiple users of the online system 140 in content accessible to various users of the online system 140. For example, the persistent link is included on a page of content maintained by the online system 140 that is accessible to multiple online system users 140 or is selected by the online system 140 for inclusion in feeds of content presented to one or more users. Alternatively, a user in a group who is authorized to invite other users to the group to generate an invitation that is invalidated after being accessed by a single user; for example, the invitation identifies a particular entity (e.g., a particular user of the online system 140, a particular entity external to the online system 140) and includes instructions executable a single time to request the particular entity join the group.

In various embodiments, the invitation sent to the entity outside the set of users persists after the entity becomes a user of the online system 140 included in the set and until the entity joins the group or declines the invitation while a user included in the set. When the entity becomes a user included in the set, the entity may accept the invitation and become a member of the group. If the entity accepts the invitation after becoming a user included in the set, the entity becomes a member of the group capable of accessing content provided to the group or providing content to the group. Content provided to the group prior to the entity becoming a user of the online system 140 included in the set of users and a member of the group is provided to the entity after becoming a user of the online system 140 included in the set of users and who is a member of the group.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining information identifying a set of users at an online system, wherein each user in the set is a member of an organization;
maintaining a list of categories, each category associated with one or more access rights regulating access to content by users of the online system and each category identifying a relationship between users authorized to access content associated with the category and the organization;
receiving a request from a user in the set of users to establish a group of users, the group including one or more users from the set of users;
identifying one or more categories from the list of categories to the user;
presenting the identified one or more categories to the user;
receiving a selection of a category from the identified one or more categories from the user;
storing information describing the group of users and associating the selected category of access rights with the group of users;
receiving a request from a user of the group to invite a first entity outside of the set of users who are members of the organization;
generating an invitation to the group, the invitation including information identifying the online system, information identifying the group, and instructions that, when executed, obtain information for communicating with the first entity, the invitation being invalidated after being executed a single time by the first entity to request to join the group;
communicating the invitation to a client device associated with the first entity;
receiving, from the first entity, identifying information for the online system to communicate with the first entity in response to the invitation communicated to the client device associated with the first entity, the first entity remaining outside of the online system; and
receiving, by the first entity, content associated with the group without being a user of the online system.

2. The method of claim 1, further comprising:
receiving a request to provide content to the group from an additional user; and
providing the content to the group in response to access rights associated with the selected category authorizing the additional user to provide content to the group.

3. The method of claim 1, further comprising:
receiving a request to access content associated with the group from an additional user; and
providing the content associated with the group to the additional user in response to access rights associated with the selected category authorizing the additional user to access the content associated with the group.

4. The method of claim 1, wherein the maintained information identifying the set of users identifies a role within the organization associated with each user in the set.

5. The method of claim 4, wherein access rights associated with each category identify one or more roles of users within the organization authorized to access content associated with the category.

6. The method of claim 4, wherein access rights associated with each category identify one or more roles of users within the organization prevented from accessing content associated with the category.

7. The method of claim 1, wherein access rights associated with each category identify one or more characteristics of users authorized to access content associated with the category.

8. The method of claim 1, wherein access rights associated with each category identify one or more characteristics of users prevented from accessing content associated with the category.

9. The method of claim 1, wherein access rights associated with each category identify one or more characteristics of users authorized to perform one or more actions associated with the category.

10. The method of claim 9, wherein an action associated with the category is selected from a group consisting of: inviting an additional user to a group associated with the category, providing content to the group associated with the category, removing an additional user from the group associated with the category, removing content from the group associated with the category, and any combination thereof.

11. The method of claim 1, further comprising:
receiving the information for communicating with the first entity; and
communicating a notification to the first entity via the information for communicating with the first entity identifying content provided to the group.

12. The method of claim 1, wherein the invitation comprises a link including a destination address of the online system, a group identifier corresponding to the group, and instructions that, when executed, obtain an e-mail address associated with the second entity.

13. A computer program product comprising a non-transitory computer-readable storage medium having instructions encoded thereon that, when executed by a processor, cause the processor to:
maintain information identifying a set of users at an online system, wherein each user in the set is a member of an organization;
maintain a list of categories, each category associated with one or more access rights regulating access to content by users of the online system and each category identifying a relationship between users authorized to access content associated with the category and the organization;
receive a request from a user in the set of users to establish a group of users, the group including one or more users from the set of users;
identify one or more categories from the list of categories to the user;
present the identified one or more categories to the user;
receive a selection of a category from the identified one or more categories from the user;
store information describing the group of users and associating the selected category of access rights with the group of users;
receive a request from a user of the group to invite a first entity outside of the set of users who are members of the organization;
generate an invitation to the group, the invitation including information identifying the online system, information identifying the group, and instructions that, when executed, obtain information for communicating with the first entity, the invitation being invalidated after being executed a single time by the first entity to request to join the group;

communicate the invitation to a client device associated with the first entity;

receive, from the first entity, identifying information for the online system to communicate with the first entity in response to the invitation communicated to the client device associated with the first entity, the first entity remaining outside of the online system; and receiving, by the first entity, content associated with the group without being a user of the online system.

14. The computer program product of claim 13, wherein the maintained information identifying the set of users identifies a role within the organization associated with each user in the set.

15. The computer program product of claim 14, wherein access rights associated with each category identify one or more roles of users within the organization authorized to access content associated with the category.

16. The computer program product of claim 14, wherein access rights associated with each category identify one or more roles of users within the organization prevented from accessing content associated with the category.

17. The computer program product of claim 13, wherein the computer readable storage medium further has instructions encoded thereon that, when executed by the processor, cause the processor to receive the information for communicating with the second entity; and communicate a notification to the second entity via the information for communicating with the second entity identifying content provided to the group.

18. The computer program product of claim 13, wherein the invitation comprises a link including a destination address of the online system, a group identifier corresponding to the group, and instructions that, when executed, obtain an e-mail address associated with the second entity.

* * * * *